United States Patent [19]

Mitchell

[11] Patent Number: 4,780,656
[45] Date of Patent: Oct. 25, 1988

[54] DRIVE AND PROTECTION SYSTEM FOR VARIABLE SPEED MOTOR

[75] Inventor: Ralph M. Mitchell, Elgin, Ill.

[73] Assignee: Motorola, Inc., Schaumburg, Ill.

[21] Appl. No.: 94,196

[22] Filed: Sep. 8, 1987

[51] Int. Cl.$^4$ .................. H02P 5/40; H02H 7/122
[52] U.S. Cl. ............................ 318/798; 318/806; 323/286; 361/90; 361/30
[58] Field of Search ............... 318/798, 806; 361/90, 361/91, 92, 96, 30, 31; 363/55, 56, 57; 323/223, 299, 283, 286

[56] References Cited

U.S. PATENT DOCUMENTS

| | | | |
|---|---|---|---|
| 4,527,214 | 7/1985 | Hattori et al. | 361/96 |
| 4,594,517 | 6/1986 | Cohen et al. | 361/92 |
| 4,686,617 | 8/1987 | Colton | 363/56 |
| 4,695,961 | 9/1987 | Arinobu | 361/96 |

OTHER PUBLICATIONS

G.E. Publication "Electronics Data Library—Semiconductors; Transistors—Diodes", 2nd Edition, 1984; pp. 148-161.

Primary Examiner—David Smith, Jr.
Attorney, Agent, or Firm—Jophn H. Moore

[57] ABSTRACT

An electronic control for a motor drives the motor with pulses of current, and protects the motor from extreme values of line voltage and motor current. A current sensor, connected in series with a conductor which supplies current to the motor windings, develops a monitoring signal that is sensed for the purpose of shutting down the motor when the monitoring signal indicates that the motor current is excessive. A power supply in the control isolates the control from the AC line voltage, provides regulated DC voltages to power various portions of the control, and provides an unregulated DC sense voltage which indicates when the AC line voltage is too high or too low so that the motor can be shut down.

11 Claims, 3 Drawing Sheets 4,780,656

DRIVE AND PROTECTION SYSTEM FOR VARIABLE SPEED MOTOR

FIELD OF THE INVENTION

This invention is generally directed to the field of motor control. It is particularly directed to variable speed motor controls such as inverters, and to techniques for protecting such controls and their motors from extreme values of current and/or voltage.

BACKGROUND OF THE INVENTION

Motor controls of the type considered herein are generally well known and documented. See, for example, the General Electric publication entitled "Electronics Data Library—Semiconductors; Transistors—Diodes" (1984).

Generally, such motor controls vary the speed of a three-phase induction motor by altering either the voltage, the frequency, or both, of the drive signal applied to the stator windings of the motor. In such applications, it is desirable to protect both the motor and the control from extreme values of voltage and/or current. One such known method is to include a pair of current sensors, each being situated in series with a motor winding. When extreme motor currents are detected by either sensor, the motor can be shut down to prevent damage to it. Although this technique works well, its drawback resides in the requirement for at least two current sensors.

It is also desirable to isolate the motor's control logic and drive circuits from the AC line voltage (i.e., he AC "mains") and to protect the motor and the control from extreme variations in the amplitude of the AC line voltage. Such isolation and protection are conventionally provided by using a transformer or optical coupler to isolate the control from the AC line voltage. An additional transformer is used to sense extreme variations in the AC line voltage so that the control and the motor can be protected when such extreme variations occur. For economy, however, it is desirable to achieve the same results without the use of the additional transformer.

OBJECTS OF THE INVENTION

It is a general object of the invention to provide a drive control for a variable speed motor that is more simple and more cost effective than the conventional techniques described above.

It is a more specific object of the invention to provide an improved system for driving a variable speed motor, as well as for protecting the motor from extreme currents and extreme amplitude variations in the AC line voltage.

DESCRIPTION OF THE PREFERRED EMBODIMENT

Figure 1:
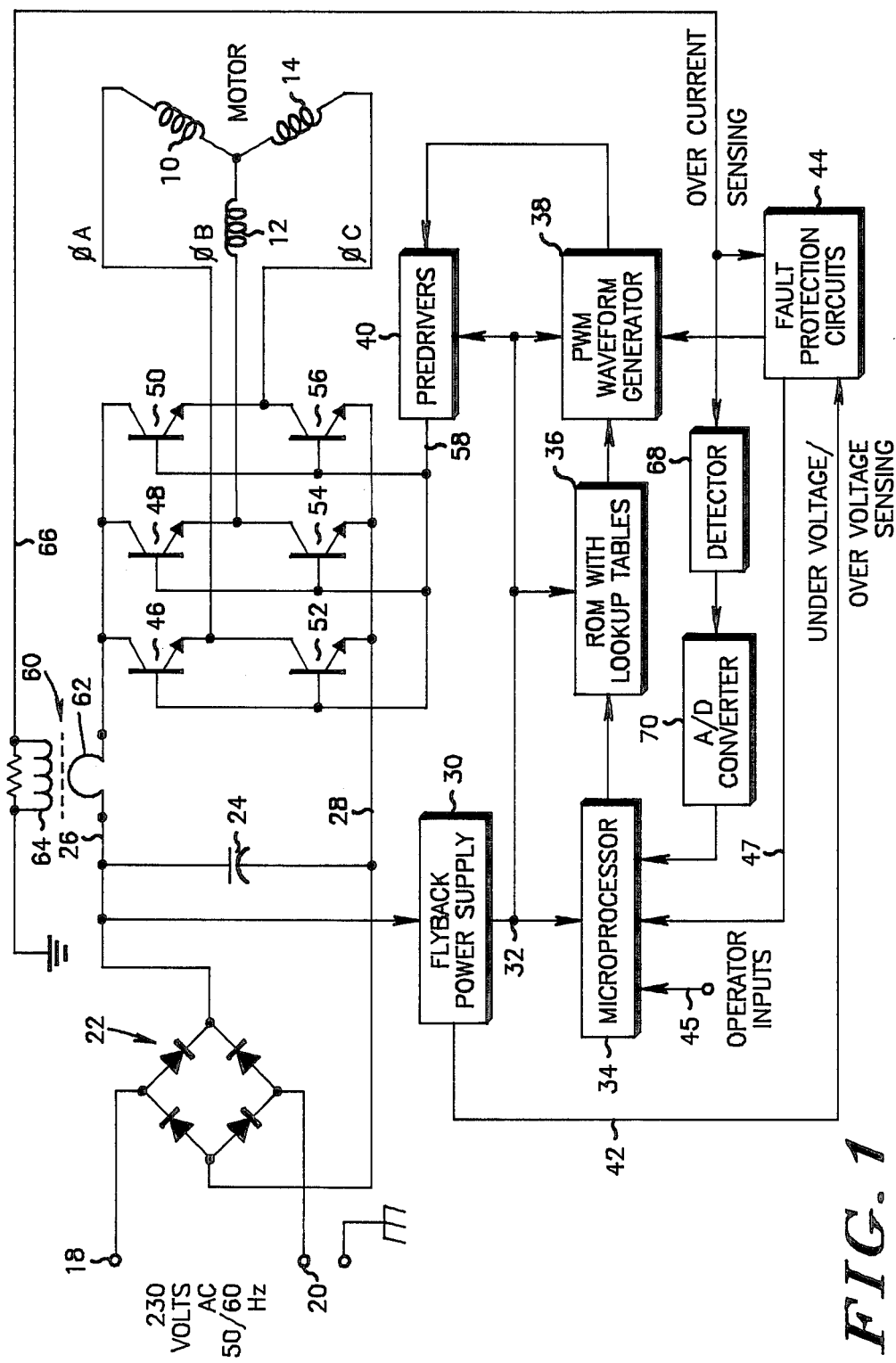
FIG. 1 shows a motor control system which incorporates various aspects of the invention, including protection circuitry for the motor and for the control.

Referring now to FIG. 1, a system is shown for driving a variable speed, three-phase motor which is indicated by its stator windings 10, 12 and 14. Power for the system is typically from a 230 volt AC line, 50 or 60 Hertz, and is received at input terminals 18 and 20. A diode bridge rectifier 22 acts as a first power supply for developing, in conjunction with a filter capacitor 24, an unregulated DC voltage between conductors 26 and 28.

The unregulated DC voltage on the conductor 26 is coupled to a flyback power supply 30. This supply develops at least one regulated DC output voltage for use as a power source by components within the control. For example, the illustrated embodiment provides a regulated DC voltage on a conductor 32 for powering a microprocessor 34, a ROM 36, a waveform generator 38 and predrivers 40. Typically, additional regulated DC voltages will also be generated by the power supply 30 to power the same and/or other components within the control.

The flyback power supply 30 also develops a sense voltage on a lead 42. This sense voltage, described in more detail below, is used to sense under voltage and over voltage conditions so that fault protection circuits 44 may shut down the motor.

Referring now to the microprocessor 34 which may be a type MC6801 made by Motorola, Inc., this device receives, via a terminal 45, operator inputs which may start/stop the motor, request a speed change, etc. Suffice it to say for purposes of this invention that the microprocessor is programmed to deliver appropriate output signals to the ROM 36 to effectuate proper excitation of the motor. The ROM 36, also a conventional device, has a look-up table from which it extracts and outputs a suitable signal in response to commands from the microprocessor 34, for selecting the proper waveforms from the PWM (pulse width modulation) waveform generator 38. The latter device, also conventional, develops patterns of selected width-modulated pulses for properly exciting the motor. Herein, these pulses developed by the waveform generator 38, under the control of the microprocessor 34 and ROM 36, are referred to as control signals. These control signals are used to control the application of currents to the motor windings 10, 12, and 14. The microprocessor 34, the ROM look-up tables 36 and the PWM waveform generator are referred to collectively as the "control logic."

The motor drive circuitry which responds to the control signals includes predrivers 40 and an inverter comprised of six transistors numbered 46 through 56. The predrivers 40 amplify the control signals and supply the amplified signals to the inverter via a bus 58. Although the bus 58 is shown as a single line, it should be understood that it is a collection of six lines, each of which is connected to a base of one of the transistors in the inverter so that each transistor 46 - 56 can be controlled independently. The General Electric publication referred to previously describes the operating principles of this type of configuration. Briefly, the transistors which comprise the inverter are turned on in pairs by the previously-discussed control signals so as to connect the unregulated DC voltage on the conductor 26 to the motor windings to develop pulses of current in those windings.

To protect the motor from high currents and to assist in the control of the motor currents, a current sensor in the form of a transformer 60 is included. This transformer has a primary winding 62 (which may be a single turn of the conductor 26) which is connected in series with the conductor 26. A multiple-turn secondary winding 64 develops a voltage that is proportional to current variations in the primary winding 62.

Even though the transformer 60 is situated in a DC conductor 26, the currents in the conductor 26 will vary and will correspond to the currents in the motor windings. Hence, the transformer's secondary winding 64 will develop voltages which are representative of the variations in the motor currents. This technique allows the removal of the two current sensors which are conventionally coupled directly in series with two of the motor windings.

The voltage across the secondary winding 64, referred to herein as a monitoring signal, is coupled via a lead 66 to the fault protection circuits 44 and to a detector 68. The detector 68 (described in more detail below) senses the amplitude of the monitoring signal and feeds it to a conventional analog-to-digital converter 70. The digitized value of the monitoring signal is provided to the microprocessor 34 which is programmed to use this "feedback" information to vary the control signals which control the application of current to the motor windings so as to increase the efficiency of the motor.

As mentioned above, the monitoring signal is also sent to the fault protection circuits 44 in order to shut the motor down when the monitoring signal indicates that the current in the motor windings is excessive. Details of the protection circuits and of the detector 68 are shown in FIG. 2, to which reference is now made.

The output of the transformer 60 (shown again in FIG. 2) is half-wave rectified by a diode 72 and its negative-going excursions are clamped at or near ground level by another diode 74. A variable resistor 76, in series with a fixed resistor 78, may be included to calibrate the amplitude of the signal at node 80 to a nominal value.

The signal at the node 80 is filtered by a capacitor 81 and is coupled via a resistor 82 to another node 83. The latter node is clamped via a diode 84 to $V_{cc}$ and to the positive input of an operational amplifier 86. A diode 88 and a resistor 90 are coupled in circuit with the amplifier 86 to form a peak detector, with a resistor 91 and a capacitor 92 coupled in parallel between ground and the cathode of the diode 88. The detected peak value of the monitoring signal is provided at an output terminal 93, and from there it is coupled to the analog-to-digital converter 70 (FIG. 1) for further processing as described above.

Figure 2:
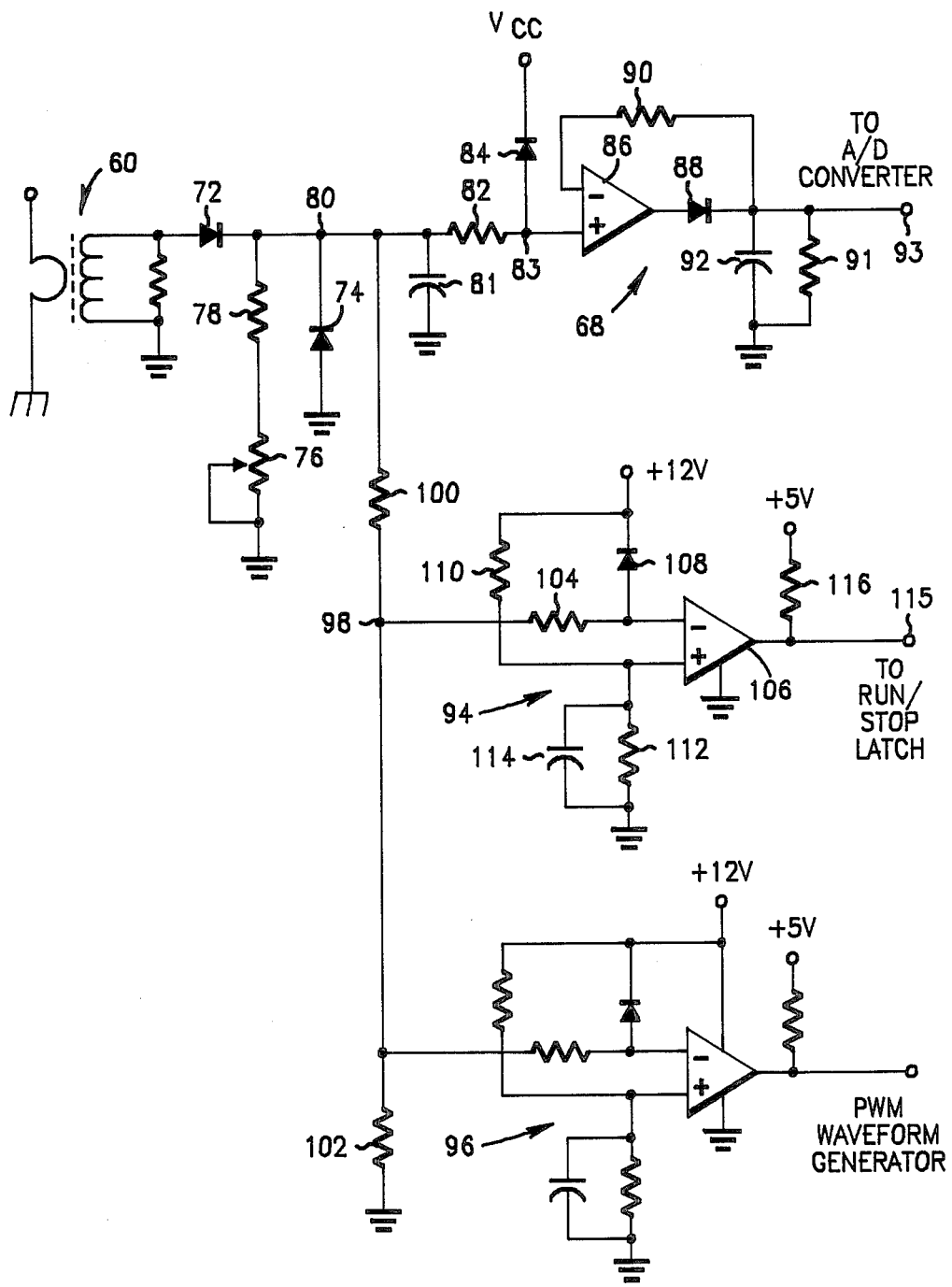
FIG. 2 is a more detailed diagram of some of the fault protection circuits and the detector shown in FIG. 1.

The fault protection circuitry of FIG. 2 includes comparators 94 and 96. The input to the comparator 94 is taken from the junction (node 98) of a voltage divider formed by resistors 100 and 102. The monitoring signal appearing at the node 98 is coupled via a resistor 104 to the negative input of an operational amplifier 106. The same input is clamped to a potential that is one diode drop above the +12 volt power source by a diode 108. The positive terminal of the amplifier 106 is at a reference potential as set by the ratio of resistors 110 and 112, the latter of which is bypassed by a capacitor 114. The output of the amplifier, at terminal 115, is coupled to a +5 volt source via a pull-up resistor 116 to establish the proper DC operating level for the run/stop latch which receives the signal from terminal 115.

In operation, the comparator 94 compares the monitoring signal, as it appears at its negative input, to a reference level established at its positive input. When the level of the monitoring signal exceeds the reference level, the comparator 94 develops, at output terminal 115, a motor shut-down signal. The latter signal may be coupled to a conventional run/stop latch (not shown) whose output is received by the microprocessor 34, via line 47 (FIG. 1), to inhibit the motor from starting when the monitoring signal indicates that the motor starting current has risen to an excessive level.

The other comparator 96 is constructed similarly to the comparator 94. Therefore, it will not be described further except to say that it also receives the monitoring signal from the node 98 and compares the received value of the monitoring signal to a different, lower reference level. If, during the motor's run mode, the level of the monitoring signal indicates that the run current is excessive, the comparator 94 develops a motor shut-down signal that is applied to the waveform generator 38 (FIG. 1) to shut the motor down.

As thus far described, the motor drive and protection system utilizes relatively simple and economical circuitry for applying unregulated DC voltage to the motor windings, and for sensing the level of current in the motor windings. The sensed current level is used to shut the motor down in extreme conditions which can occur during the start mode and the run mode, and, in normal conditions, to vary the control signals which control the application of current to the motor windings, thereby to permit the motor current to be changed to improve efficiency.

Additional sensing and protection circuitry is included in the flyback power supply 30 of FIG. 1, to which reference is now made. As previously discussed, the flyback power supply 30 provides a regulated DC voltage at the lead 32 for powering certain components of the control, and provides a sense voltage on the lead 42. This sense voltage is received by any conventional comparator circuit (not shown) within the fault protection circuits block 44. Such a comparator preferably develops an output signal which inhibits the motor from starting when the AC line voltage at terminals 18 and 20 is too high or too low, and shuts the motor down when the AC line voltage becomes excessive while the motor is running.

Figure 3:
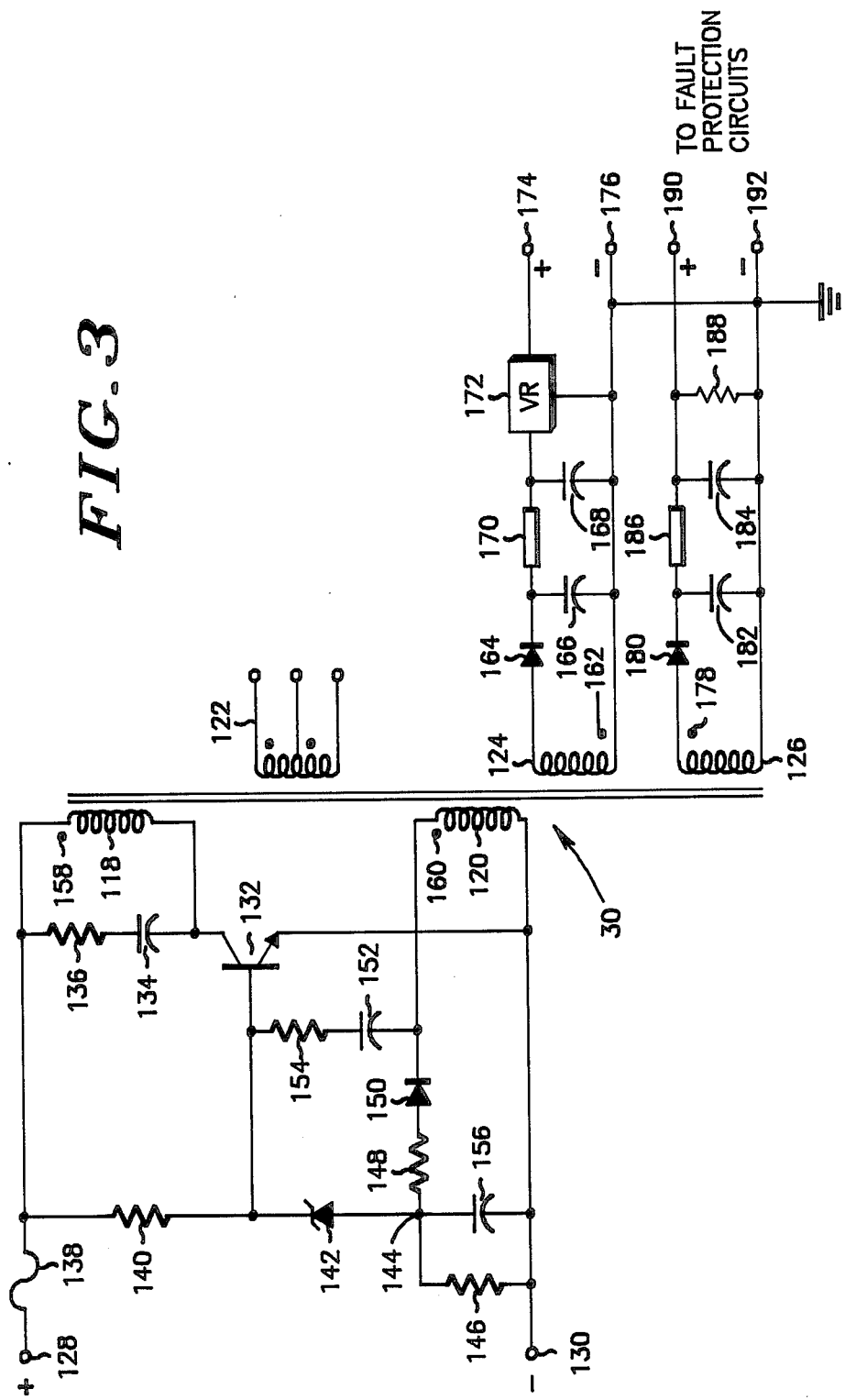
FIG. 3 is a more detailed diagram of the flyback power supply shown in FIG. 1.

The details of the flyback power supply 30 are shown in FIG. 3 which will now be described. As shown, the flyback power supply includes a transformer having primary windings 118 and 120, a secondary winding 122 which represents one of several possible secondary windings for developing miscellaneous voltages for the control, and secondary windings 124 and 126 which are discussed in more detail below.

The primary windings 118 and 120 are coupled via terminals 128 and 130 to the unregulated DC voltage developed between terminals 26 and 28 (FIG. 1). A switching transistor 132 has its emitter coupled to the terminal 130 and its collector coupled to the terminal 128 through a capacitor 134, a resistor 136, and a fuse 138. The base of the transistor 132 is coupled to a network that includes a resistor 140 and a zener diode 142. The anode of the zener diode is coupled to a node 144, from which a resistor 146 couples to the terminal 130. Also coupled to the node 144 is a resistor 148 in series with a diode 150, the latter being coupled to the primary winding 120 and to the base of the transistor 132 via a capacitor 152 and a resistor 154. Another capacitor 156 is coupled between ground and the node 144. With this arrangement, the transistor 132 operates alternately between conductive states and non-conductive states. In the conductive state, the transistor 132 develops, through the primary windings 118 and 120, a current whose amplitude varies in accordance with variations in the amplitude of the unregulated DC voltage at terminals 128 and 130. If the amplitude of the unregulated DC voltage increases (or decreases), the amplitude of the current in te primary windings 118 and 120 also increases (or decreases).

When the transistor 132 becomes non-conductive, a flyback current is established in the primary windings 118 and 120. The amplitude of the flyback current is limited by the zener diode 142 which clamps the flyback current to a selected level.

Referring now to the secondary winding 124, it is wound conventionally such that its polarity is opposite the polarity of the primary windings 118 and 120. Note the dots 158 and 160 which indicate the polarity of windings 118 and 120, and the dot 162 which indicates the opposite polarity for the secondary winding 124.

Coupled to the winding 124 are a rectifying diode 164 and a filter network including capacitors 166 and 168 and a ferrite bead 170. A conventional voltage regulator 172 is coupled to the filter network to provide a regulated DC voltage between output terminals 174 and 176.

The polarity of the secondary winding 124 and the polarity of the diode 164 are selected so that the diode 164 conducts when the transistor 132 is non-conductive, i.e., when the flyback current occurs in the primary windings. Because the flyback current is clamped by the zener diode 142, amplitude variations in the unregulated DC voltage at terminals 128 and 130 do not result in noticeable amplitude variations in the flyback current. Consequently, the voltage developed by the secondary winding 124 and rectified by the diode 164 will also be free of any substantial amplitude variations. This is in accordance with conventional power supply techniques.

Referring now to the sense winding 126, its polarity is opposite the polarity of the winding 124 (see dot 178). A rectifying diode 180 couples the sense winding to a filter network comprising capacitors 182 and 184, a ferrite bead 186, and a resistor 188. The polarity of the sense winding 126 and the polarity of the diode 180 are selected so that the diode 180 conducts while the transistor 132 is on. Under that condition, the amplitude of the primary current varies in accordance with the variations in the amplitude of the unregulated DC voltage between terminals 128 and 130, and the amplitude of the rectified sense voltage developed by the sense winding 126 and diode 180 will vary in the same manner. Thus, a sense voltage is developed at output terminals 190 and 192. That sense voltage varies in accordance with variations in the unregulated DC voltage between terminals 128 and 130 and is applied to the fault protection circuits 44 (FIG. 1) wherein a conventional comparator (not shown) or the like can monitor the level of the sense voltage to shut down the motor when the amplitude of the sense voltage is indicative of an extreme variation in the amplitude of the unregulated DC voltage developed by the rectifier 22 (FIG. 1). Since that unregulated DC voltage varies in accordance with variations in the AC line voltage at terminals 18 and 20, the motor will be shut down when extreme variations occur in the amplitude of the AC line voltage.

It will be appreciated that the flyback power supply 30 not only isolates the control from the AC line and provides regulated DC voltages for powering various portions of the control, but it also provides a non-regulated DC output voltage (the sense voltage) which varies with variations in the AC line voltage. As discussed, the extreme variations in the sense voltage will cause the motor to be shut down. This has all been accomplished by using a single transformer, thereby lowering the expense of the control.

Although the invention has been described in terms of preferred circuitry, it will be obvious to those skilled in the art that many alterations and variations may be made to achieve similar results without departing from the invention. Accordingly, it is intended that all such alterations and variations be considered as within the spirit and scope of the invention as defined by the appended claims.

I claim:

1. In an electronic control which is powered by an AC voltage source and which includes control logic to generate control signals for controlling the application of currents to windings of a variable speed motor, a system for driving the motor, as well as for protecting the motor from extreme currents and extreme amplitude variations in the AC voltage source, while isolating the control logic from the AC voltage source, the system comprising:
 a first power supply coupled to the AC voltage source for developing an unregulated DC voltage;
 motor drive circuitry coupled to the windings of the motor and receiving the control signals;
 a conductor coupling the unregulated DC voltage from the first power supply to the motor drive circuitry, said motor drive circuitry being responsive to the control signals for coupling the DC voltage to the windings of the motor to develop pulses of current in the windings;
 a transformer having a primary winding and a secondary winding, the primary winding being coupled in series with said conductor so that the secondary winding develops a monitoring signal indicative of the amplitude of current variations in the conductor and, therefore, indicative of the amplitude of currents in the motor windings;
 measuring means coupled to the transformer's secondary winding for measuring the monitoring signal so that the motor may be shut down when extreme values of the monitoring signal are sensed; and
 a second power supply coupled to the unregulated DC voltage developed by the first power supply, said second power supply developing at least one regulated DC output voltage for use as a power source by the control logic and developing a sense voltage whose amplitude varies with changes in the amplitude of the unregulated DC voltage so that the sense voltage may be monitored to shut down the motor when the amplitude of the sense voltage indicates an extreme variation in the amplitude of the unregulated DC voltage, and hence, extreme variations in the amplitude of the voltage from the AC voltage source.

2. A system as set forth in claim 1 further including circuit means coupled to the transformer's secondary winding for converting the value of the monitoring signal to a digital value, whereby the digital value may be used to vary the control signals which control the application of current to the motor's windings so as to increase the motor's efficiency.

3. A system as set forth in claim 2 wherein said circuit means includes means for detecting the peak amplitude of the monitoring signal and means for converting the peak amplitude to a digital value.

4. A system as set forth in claim 1 wherein said measuring means compares the monitoring signal to a reference signal and develops a motor shut-down signal when the monitoring signal exceeds the reference signal.

5. A system as set forth in claim 1 wherein said second power supply includes a transformer having a primary winding, at least one secondary load winding, and a secondary sense winding, the primary winding being coupled to the unregulated DC voltage developed by the first power supply, the secondary load winding being selected to develop a load voltage for use in the control, and the sense winding being selected to develop said sense voltage.

6. In an electronic control which is powered by an AC voltage source and which includes control logic to generate control signals for controlling the application of currents to windings of a variable speed motor, a system for driving the motor, as well as for protecting the motor from extreme currents and extreme amplitude variations in the AC voltage source, while isolating the control logic from the AC voltage source, the system comprising:

a first power supply coupled to the AC voltage source for developing an unregulated DC voltage;

motor drive circuitry coupled to the windings of the motor and receiving the control signals;

a conductor coupling the unregulated DC voltage from the first power supply to the motor drive circuitry, said motor drive circuitry being responsive to the control signals for coupling the DC voltage to the windings of the motor to develop pulses of current in the windings;

a transformer having a primary winding and a secondary winding, the primary winding being coupled in series with said conductor so that the secondary winding develops a monitoring signal indicative of the amplitude of current variations in the conductor and, therefore, indicative of the amplitude of currents in the motor windings;

measuring means coupled to the transformer's secondary winding for measuring the monitoring signal so that the motor may be shut down when extreme values of the monitoring signal are sensed; and a second power supply coupled to the unregulated DC voltage developed by the first power supply, said second power supply including a transformer having a primary winding, at least one secondary load winding, and a secondary sense winding, the primary winding being coupled to the unregulated DC voltage developed by the first power supply, the secondary load winding being selected to develop a load voltage for use as a power source by the control logic, and the sense winding being selected to develop a sense voltage whose amplitude varies with changes in the amplitude of the unregulated DC voltage so that the sense voltage may be monitored to shut down the motor when the amplitude of the sense voltage indicates an extreme variation in the amplitude of the unregulated DC voltage, and hence, extreme variations in the amplitude of the voltage from the AC voltage source;

said second power supply also including a switching transistor coupled to the primary winding so as to operate alternately between conductive and non-conductive states to establish, in the conductive state, a current through the primary winding that varies in accordance with variations in the amplitude of the unregulated DC voltage and to establish, in the non-conductive state, a flyback current in the primary winding;

a clamping device coupled in circuit with the switching transistor and the primary winding of the transformer to limit the amplitude of the flyback current;

a first rectifier coupled in circuit with the secondary load winding, the polarity of the rectifier and the polarity of the secondary load winding being selected such that the amplitude of the developed load voltage is dependent on the amplitude of the flyback current in the primary winding;

a second rectifier coupled in circuit with the secondary sense winding, the polarity of the rectifier and the polarity of the sense winding being selected such that the amplitude of the developed sense voltage is dependent on the current developed in the primary winding when the transistor is in the conducting state.

7. In an electronic control which is powered by an AC voltage source and which generates control signals for controlling the application of currents to windings of a variable speed motor, a system for driving the motor and for protecting the motor from extreme currents and extreme amplitude variations in the AC voltage source, the system comprising:

a power supply coupled to the AC voltage source for developing an unregulated DC voltage;

motor drive circuitry coupled to the windings of the motor and receiving the control signals;

a conductor coupling the unregulated DC voltage from the first power supply to the motor drive circuitry, said motor drive circuitry being responsive to the control signals for coupling the DC voltage to the windings of the motor to develop pulses of current in the windings;

a sensor coupled to said conductor for sensing the amplitude of current pulses therein;

means coupled to the sensor for measuring the amplitude of the current pulses so that the motor may be shut down when extreme values of the current pulses are measured;

a transformer having a primary winding, at least one secondary load winding, and a secondary sense winding, the primary winding being coupled to the unregulated DC voltage developed by the power supply, the secondary load winding being selected to develop a load voltage for use in the control, and the sense winding being selected to develop a sense voltage whose amplitude varies with changes in the amplitude of the unregulated DC voltage so that the sense voltage may be monitored to shut down the motor when the amplitude of the sense voltage indicates an extreme variation in the amplitude of the unregulated DC voltage.

8. A system as set forth in claim 7 further including circuit means coupled to said sensor for detecting and digitizing the sensed values of current pulses, whereby the digitized values may be used to vary the control signals which control the application of current to the motor's windings.

9. In an electronic control which is powered by an AC voltage source and which generates control signals for controlling the application of currents to windings of a variable speed motor, a system for driving the motor and for protecting the motor from extreme currents and extreme amplitude variations in the AC voltage source, the system comprising:

a power supply coupled to the AC voltage source for developing an unregulated DC voltage;

motor drive circuitry coupled to the windings of the motor and receiving the control signals;

a conductor coupling the unregulated DC voltage from the first power supply to the motor drive circuitry, said motor drive circuitry being responsive to the control signals for coupling the DC voltage to the windings of the motor to develop pulses of current in the windings;

a sensor coupled to said conductor for sensing the amplitude of current pulses therein;

means coupled to the sensor for measuring the amplitude of the current pulses so that the motor may be shut down when extreme values of the current pulses are measured;

a transformer having a primary winding, at least one secondary load winding, and a secondary sense winding, the primary winding being coupled to the unregulated DC voltage developed by the power supply, the secondary load winding being selected to develop a load voltage for use in the control, and the sense winding being selected to develop a sense voltage whose amplitude varies with changes in the amplitude of the unregulated DC voltage;

a switching transistor coupled to the transformer's primary winding so as to operate alternately between conductive and non-conductive states to establish, in the conductive state, a current through the primary winding that varies in accordance with the variations in the amplitude of the unregulated DC voltage and to establish, in the non-conductive state, a flyback current in the primary winding;

a clamping device coupled in circuit with the transistor and the primary winding to limit the amplitude of the flyback current;

a first rectifier coupled in a circuit with the secondary load winding, the polarity of the rectifier and the polarity of the secondary load winding being selected such that the amplitude of the load voltage is dependent on the amplitude of the flyback current in the primary winding; and a second rectifier coupled in circuit with the secondary sense winding the polarity of the rectifier and the polarity of the sense winding being selected such that the amplitude of the sense voltage is dependent on the current developed in the primary winding when the transistor is in the conducting state, whereby the resultant sense voltage varies in accordance with variations in the unregulated DC voltage.

10. In an electronic control which is powered by an AC voltage source and which includes control logic to generate control signals for controlling the application of currents to windings of a variable speed motor, a system for driving the motor, as well as for protecting the motor from extreme currents and extreme amplitude variations in the AC voltage source, while isolating the control logic from the AC voltage source, the system comprising:

a first power supply coupled to the AC voltage source for developing an unregulated DC voltage;

motor drive circuitry coupled to the windings of the motor and receiving the control signals;

a conductor coupling the unregulated DC voltage from the first power supply to the motor drive circuitry, said motor drive circuitry being responsive to the control signals for coupling the DC voltage to the windings of the motor to develop pulses of current in the windings;

a first transformer having a primary winding and a secondary winding, the primary winding being coupled in series with said conductor so that the secondary winding develops a monitoring signal indicative of the amplitude of current variations in the conductor;

measuring means receiving the monitoring signal for comparing the monitoring signal to a reference signal and for developing a motor shut-down signal when the monitoring signal exceeds the reference signal;

circuit means receiving the monitoring signal for digitizing the value of the monitoring signal, so that the digitized value may be used to vary the control signals which control the application of current to the motor's windings;

a second transformer having a primary winding, at least one secondary load winding, and a secondary sense winding, the primary winding receiving the unregulated DC voltage, the secondary load winding being selected to develop a load voltage for use by the control logic, and the sense winding being selected to develop a sense voltage whose amplitude varies with changes in the amplitude of the unregulated DC voltage so that the sense voltage may be monitored to shut down the motor when the amplitude of the sense voltage becomes excessive.

11. In an electronic control which is powered by an AC voltage source and which controls the excitation of a motor, the combination comprising:

a first power supply coupled to the AC voltage source for developing an unregulated DC voltage;

a transformer having a primary winding receiving the unregulated DC voltage, having at least one secondary load winding for driving a load, and having at least one secondary sense winding;

a switching transistor coupled to the primary winding so as to operate alternately between conductive and non-conductive states to establish, in the conductive state, a current through the primary winding that varies in accordance with variations in the amplitude of the unregulated DC voltage and to establish, in the non-conductive state, a flyback current in the primary winding;

a clamping device coupled in circuit with the transistor and the primary winding to limit the amplitude of the flyback current;

a first rectifier coupled in circuit with the secondary load winding for developing a rectified load voltage, the polarity of the rectifier and the polarity of the secondary load winding being selected such that the amplitude of the load voltage is dependent on the amplitude of the flyback current in the primary winding;

a second rectifier coupled in circuit with the secondary sense winding for developing a rectified sense voltage, the polarity of the rectifier and the polarity of the sense winding being selected such that the amplitude of the sense voltage is dependent on the current developed in the primary winding when the transistor is in the conducting state, whereby the resultant sense voltage varies in accordance with variations in the unregulated DC voltage while the load voltage remains sustantially constant.

* * * * *